Inventor:
Wilhelm Friedrichs

Dec. 31, 1929.  W. FRIEDRICHS  1,741,927
CASH FRANKING MACHINE
Filed Aug. 8, 1922      10 Sheets-Sheet 9

Inventor:
Wilhelm Friedrichs
By Knight Bros.
atty

Dec. 31, 1929.　　　W. FRIEDRICHS　　　1,741,927
CASH FRANKING MACHINE
Filed Aug. 8, 1922　　　10 Sheets-Sheet 10

Inventor:
Wilhelm Friedrichs
By Knight Bros.

Patented Dec. 31, 1929

1,741,927

UNITED STATES PATENT OFFICE

WILHELM FRIEDRICHS, OF BERLIN, GERMANY

CASH-FRANKING MACHINE

Application filed August 8, 1922, Serial No. 580,450, and in Germany August 10, 1921.

This invention relates to a cash franking machine. It has for its objects to essentially facilitate the control and to simplify the same without complicating the construction of the machine by these improvements.

This invention relates to improvements in franking machines of the kind provided with locking mechanism which unlocks the machine ready for use when a token is inserted therein. The locking device is under the control of a totalizing device which adds the values of the franks impressed, and, when their sum reaches a predetermined amount, operates the locking device to prevent further operation of the machine until the old token is replaced by a new one.

In the known form of construction of machines of this type, the token itself is utilized to unlock the locking mechanism positively, to render the machine operative, the token being in the form of an actual coin, or a similar disk, given by the postal officials in exchange for a coin.

According to the present invention the locking mechanism is adapted to be unlocked by a device which is prevented from performing this function until a card, ticket, or the like is inserted into it, and which, when shoved in with its enclosed card to unlock the machine, is held in this position until the machine has again been locked through the instrumentality of the totalizing device. The lock operating device is automatically released as the machine is locked, and can be pulled out to replace the old ticket by a new one.

In order to detect fraudulent operation, for instance, the use of the same card more than once, or the use of an unauthorized card, marking or impressing mechanism is provided for marking or impressing the cards, (preferably in intaglio) as will be described later.

In order that the invention may be clearly understood, I shall proceed to describe hereafter the same with reference to the forms of construction of the machine as shown on the accompanying drawings, wherein:

Fig. 2 is a cross section on line A—B of Fig. 1a.

Fig. 4 is a cross section on line E—F of Fig. 1a.

Fig. 5 is a section on line G—H of Fig. 1a.

Figs. 7–11 illustrate an automatic coupling and uncoupling mechanism for the driving motor of a cash-franking machine.

The machine will first be briefly described in connection with Figs. 1 and 1a so that the general operation may be understood.

The frank printing device of the desired value is first adjusted into operative position by rotating the drum 1, 2 by means of the hand wheel 19. In this way the stamp of the desired value is brought under the counter-pressure rollers 39.

The letter to be stamped is now introduced between the printing roller 3 and the counter-pressure rollers 39. It is at first engaged only by the counter-pressure rollers 39 and the advancing rollers 38. By the engagement of the forward edge of the letter with a key 40 (Fig. 1ª), the printing roller 3 is coupled to the driving mechanism for a single revolution, so that it prints the stamp on the letter, and the value is added in the totalizer 10. As soon as the totalizer exceeds a certain value it operates a locking device which prevents further operation of the machine.

Simultaneously with the locking of the printing mechanism a drawer 67, which has been held in by a stop until this time, is released so that it can be pulled out. In this drawer there is a card which, upon the locking of the machine, has been stamped with the total value shown in the totalizer 10 and with a consecutive number. This card is now exchanged for a new one and the drawer 67 again shoved in. By the shoving in of the drawer the machine is released for further operation and the drawer is again locked in.

Figure 1:
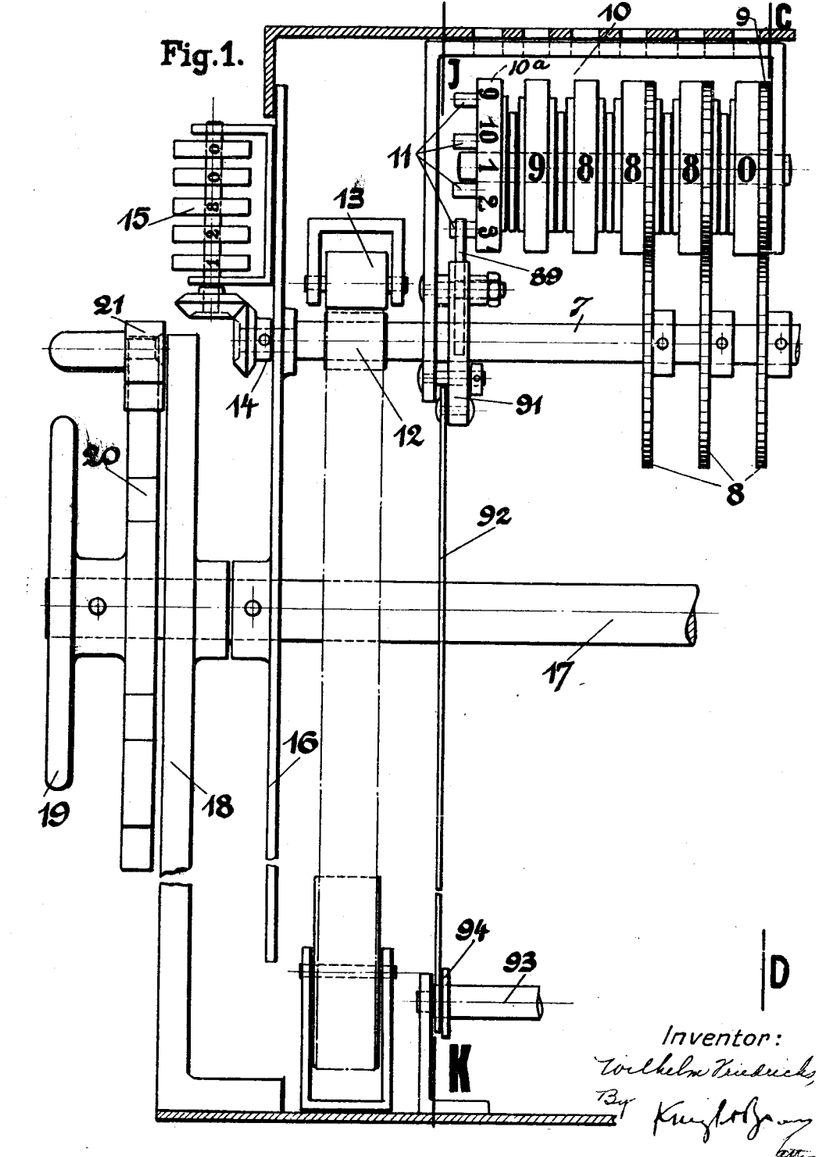
Figs. 1 and 1a show a longitudinal section through the machine.
Figure 1A:
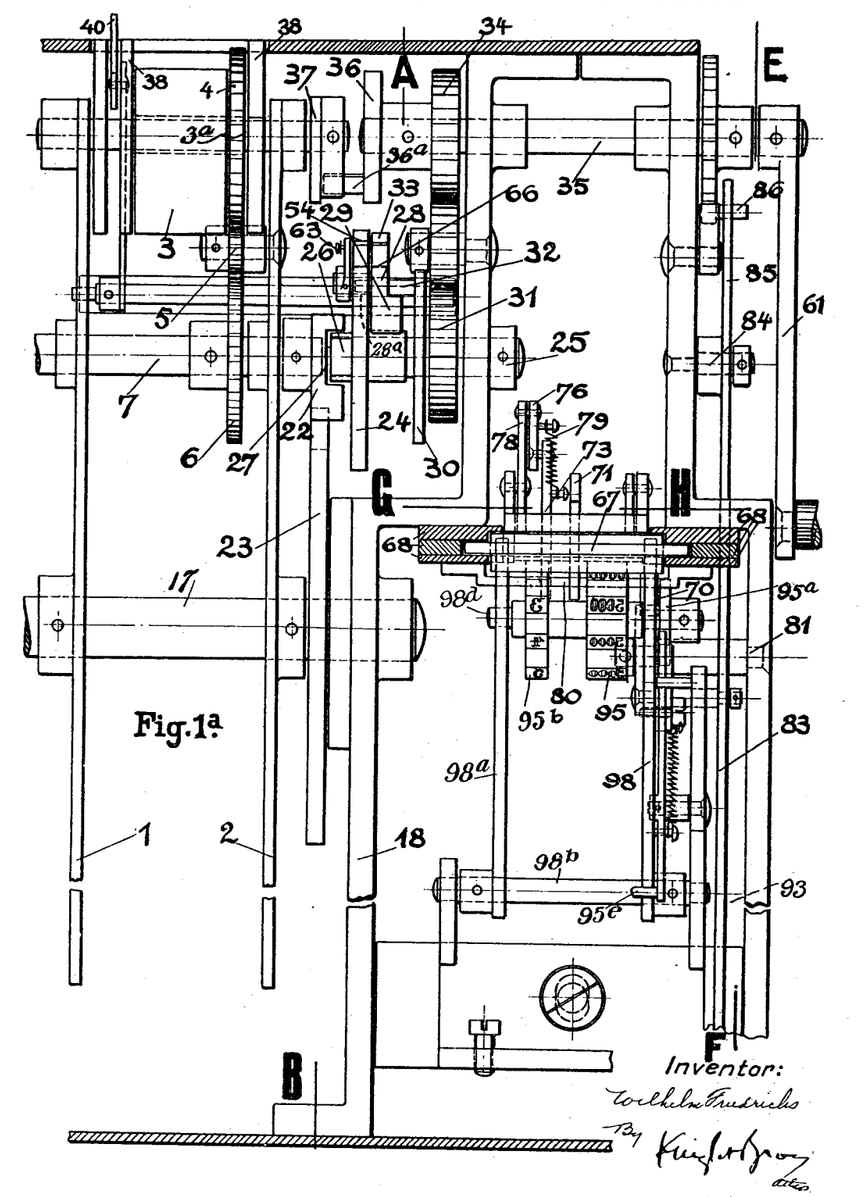
Figure 2:
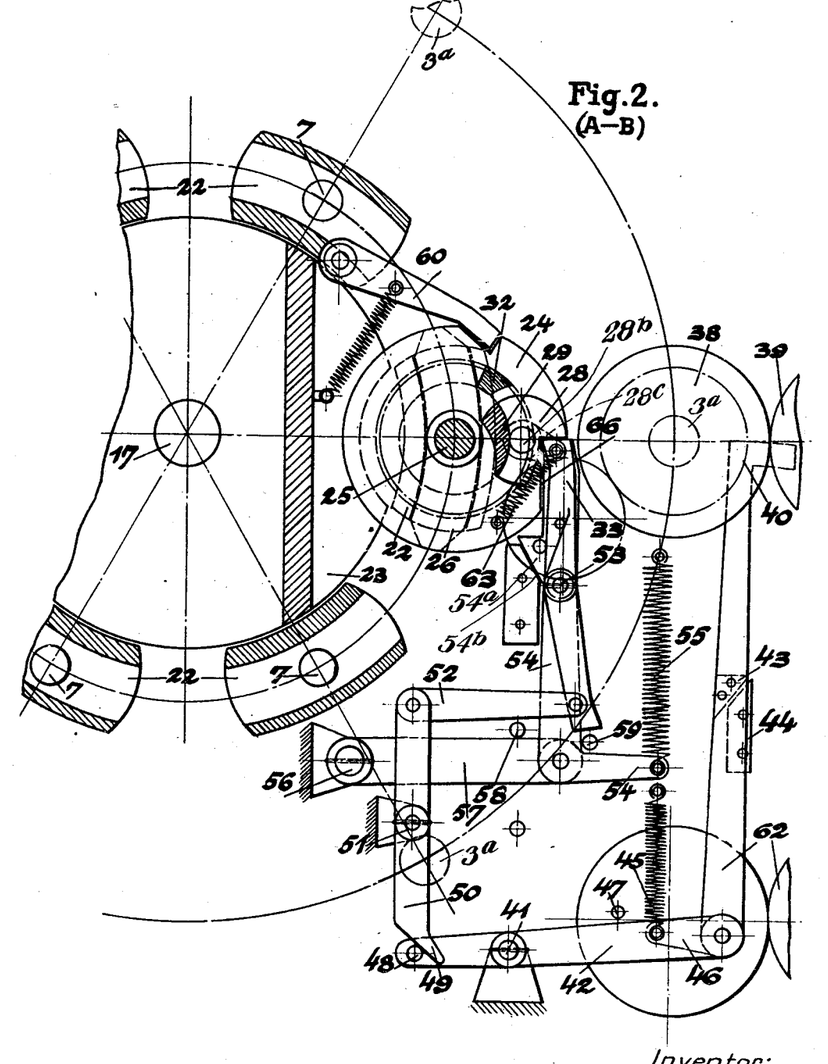
Figure 3:
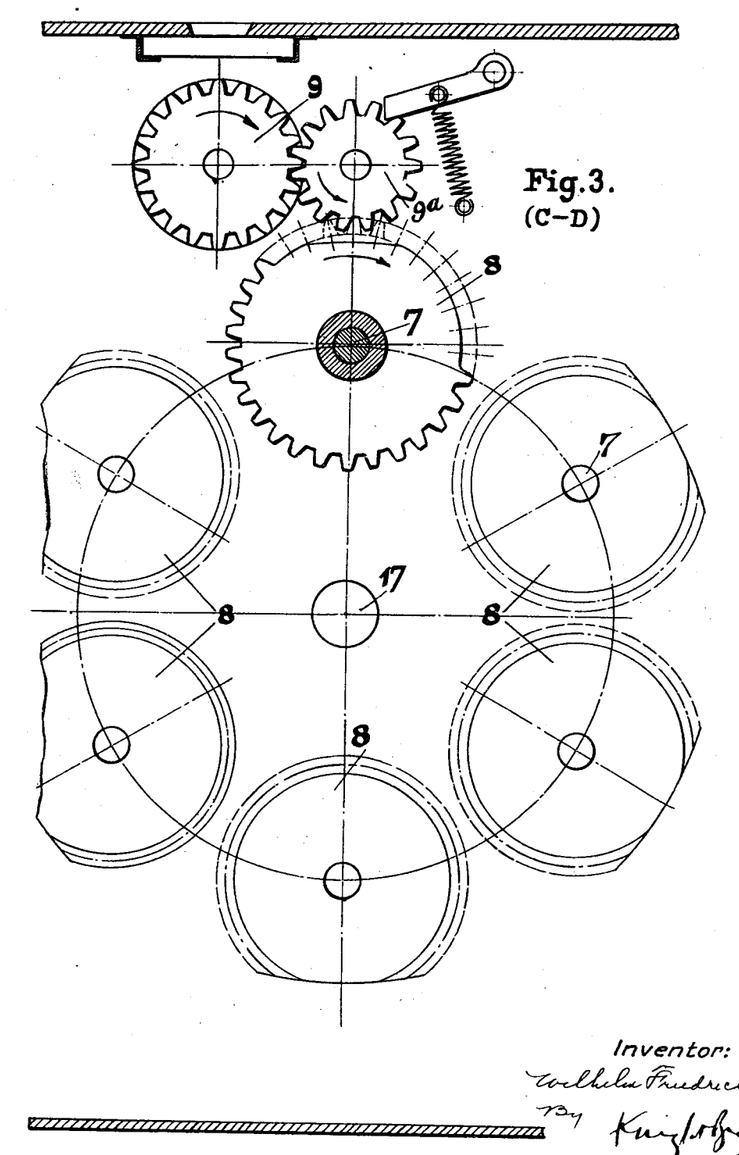
Fig. 3 is a cross section on line C—D of Fig. 1.

For the attainment of the above described results the machine is constructed in the following manner:

In the form of construction shown in Figs. 1 to 6 single printing devices 3 are mounted on shafts 3ª arranged in a circle between disks 1 and 2, only one of these printing devices 3 being shown in Fig. 1ª. The arrangement of the shafts 3ª of these printing devices is shown in Fig. 2.

The individual printing devices are freely revoluble upon their shafts and are rigidly connected with driving wheels 4 which are driven by transmission gears 5 and 6. Each gear wheel 6 is keyed upon a shaft 7 which carries wheels 8 adapted to actuate a totalizer 10 through the intermediary of toothed wheels 9ª in mesh with toothed number wheels 9 of the totalizer mechanism. The number of wheels 8 on the shafts 7 varies from one to three depending upon whether the value of the printing device connected to that particular shaft has one, two, or three digits. The first wheel 8 on the right (Fig. 1) cooperates with the units wheels of the totalizer 10, the second with the tens wheel, and the third with the hundredths wheel. Each wheel 8 has a number of teeth proportional to the value which it represents, the proportion depending upon the ratio of transmission between the wheels 8 and the number wheels 9. In the embodiment shown in the drawing it requires a movement of the wheels 8 for a distance of two teeth to cause the number wheels with which they cooperate to advance to the next higher figure. The shaft 7 which operates with the printing device 3 having a value of 10¢ has a number wheel 8 for actuating the tens wheel of the totalizer, but none for actuating the units wheel, because the number 10 has one ten and no units. This wheel 8 has two teeth which engage the toothed wheel 9ª of the tens number wheel when the shaft 7 is rotated during the printing of the stamp, and thereby advance the tens number wheel to the next higher figure. It will be seen that the shaft 7 cooperating with the printing device having a value of 15¢ has a units wheel 8 with ten teeth and a tens wheel with two teeth, while the shaft 7 cooperating with the printing device having a value of 20¢ has only a tens wheel 8 with four teeth, etc.

The last disk of this totalizing mechanism has ten pins 11 which, after the completion of each tenth revolution of this last disk act upon a locking device for the drive which will be hereinafter described. In the form of construction shown by way of example the totalizing mechanism comprises six places so that the locking is effected each time franks to the value of 1000 dollars have been applied.

Upon shafts 7 a printing block 12 is mounted above which a counter pressure roller 13 is arranged which after the completion of each revolution of the individual printing device is pressed against a paper strip which is conducted between the printing block 12 and the counter roller 13.

Upon the printing block 12 the franking value of the individual printing device is indicated so that this value is printed upon the strip.

Upon the end of shaft 7 a bevel gear is keyed which meshes with a second bevel gear and operates thus a counting mechanism 15 which indicates the total value of the frankings which have been printed by the corresponding individual printing device. The end of shaft 7 is mounted in a circular plate 16. The plates 1, 2 and 16 are arranged upon a shaft 17 which is revolubly mounted in the frame 18 of the machine. This shaft 17 has upon its outer end a hand wheel 19 designed to revolve shaft 17 and consequently the disks 1, 2, and 5 so that any desired printing device can be brought to the operating position. In order to lock the adjusted individual printing device in its operative position the hand wheel 19 has a disk 20 with notches with which a pawl 21 can engage which is adapted to be raised against the action of a spring. Upon the right hand side end of each shaft 7 a clutch member 22 is keyed, the inner surface of which, is in contact with the circumference of a disk 23 rigidly fixed upon the frame 18. The contact surface of each clutch member 22 is arcuate in accordance with the circumference of disk 23 so that it is held against rotation by disk 23. At the point at which the clutch member 22 of the individual printing device 3 which is actually in the operative position is situated the disk 23 is cut away (Fig. 2) so that at this point the clutch member 22 can freely revolve in the cut away part. The shafts 7 are thus locked in all positions except in their operative positions.

Opposite to this operative position of the shafts 7 a disk 24 is revolubly mounted upon shaft 25. This disk 24 has an arcuate projection 26, the center of its arc being at the shaft 17. Projection 26 engages with a correspondingly shaped longitudinal slot 27 of the clutch member 22 which is in the operative position so that the shaft 7 and disk 24 are coupled together.

Disk 24 is provided with an eccentrically located hole 28ª, in which is revolubly mounted a stub shaft 28ᵇ. On one end of stub shaft 28ᵇ is rigidly fastened a clutch member 28 having a projection 29. On the other end thereof is rigidly fastened an arm 28ᶜ, to the free end of which is attached a spring 63. The other end of spring 63 is attached to the disk 24. Projection 29 is bounded upon its side away from the centre of disk 24 by a cylindrical surface which is concentric to the centre of disk 24 when the cylinder 28 stands in one of its extreme positions.

Upon shaft 25 a second disk 30 is revolubly mounted one face of which is rigidly connected with a toothed wheel 31. A boss 32 projects from its other face. This boss is so arranged that, as long as projection 29 of clutch member 28 is in the position shown in Fig. 2, it can freely pass along the projection 29. Projection 29 is held in this position by pawl 33. Spring 63 tends to turn it to its other extreme position.

The toothed wheel 31 is driven from toothed wheel 34 with the aid of one or several intermediary wheels. Toothed wheel 34 is keyed upon the crank shaft 35. Crank shaft 35 may be driven by crank 61, or by power means which will be described later.

Upon the hub of toothed wheel 34 an annular projection 36 is arranged which has a pin 36ª designed to act upon a crank 37 on the shaft 3ª which is in operative position. Circular disks 38 are keyed upon shafts 3ª and serve as feeding rollers for the mail to be cash franked.

Upon this shaft 3ª the individual printing device 3 is revolubly mounted which is rigidly connected with the toothed wheel 4 as has already been mentioned above. Above the feeding rollers 38 and the individual printing device 3 the counter pressing rollers 39 are arranged which serve to maintain the letter or mail in contact with the printing device.

It will be seen from the structure so far described that any one of the individual printing devices desired may be brought to operative position by rotating the hand wheel 19, and locked in position by the pawl 21. The drive shaft 7 of the printing device which has been moved into operative position will have become coupled to the drive shaft 25 by the clutch members 22 and 26, so that when shaft 35 is turned, and projection 29 of cylinder 28 has been turned into the path of boss 32, in a manner to be presently described, power will be transmitted from shaft 35 and gear 34 through intermediary gears to gear 31, thence through disk 30, boss 32, projection 29, clutch member 28, disk 24, projection 26, clutch member 22, shaft 7, and gears 6, 5, and 4 to printing device 3. At the same time power will be transmitted from shaft 35 through projection 36, pin 36ª, crank 37, and shaft 3ª to feed rollers 38. Postal matter inserted between feed rollers 38 and pressing rollers 39 will be fed through these rollers and at the same time printing device 3 will be rotated and print the desired frank upon the postal matter.

The device for turning the projection 29 into the path of boss 32 to couple the printing device to the driving means at the proper time will now be described. Upon one side of the individual printing device 3 the end of a feeling lever 40 is arranged between the double disk 38. This lever 40 has its end bent at a slightly acute angle to its body, and said bent end normally projects beyond the circumference of the disk 38. Lever 40 is pivotally connected with a two-armed lever 42 fulcrumed at 41 and has an inclined surface 43 which is guided upon a fixed incline 44. Lever 40 is held in the normal position by the action of a spring 45 which acts upon a free end of arm 46 of lever 40. The same spring 45 serves for maintaining lever 42 in contact with the abutment 47 mounted on the frame of the machine.

The free end of the two-armed lever 42 carries a pin 48 which is in contact with an inclined surface 49 of the two-armed lever 50. This two-armed lever 50 is pivotally mounted on the frame by means of a pivot pin 51 and the link 52 is hingedly connected with the same, said link 52 being further hingedly connected with the pawl 33.

Pawl 33 is pivotally connected with a second pawl 54 by means of a bolt 53 and normally engages in an indentation of clutch member 28. The second pawl 54 engages with an indentation of disk 24 and it is held in this position by a spring 55 which acts upon a lever 57 hingedly connected with pawl 54 and fulcrumed at 56 upon the frame.

The stop pin 58 serves for limiting the movement of the lever 57 and consequently of the pawl 54 towards the left. The abutment pin 59 locks the pawl 33 against displacement in longitudinal direction towards the right as long as its right end is in the raised position as shown on the drawing. A pawl 60 engages with disk 24 preventing the rotation of disk 24 in anti-clockwise direction.

If a letter is inserted between the feed rollers 38 and the counter pressure roller 39 it moves at first freely between this roller 39 and the individual printing device 3 as this device is flattened or indented on the side toward the counter pressure roller when in normal position so that the printing device does not act upon the letter. The letter is advanced by the feeding rollers 38 which are driven by the crank shaft 35. The front edge of the letter strikes thus against the nose of the feeling lever 40 and pushes the same back. Under the influence of the incline 44 the feeling lever descends so that, after a predetermined displacement in a longitudinal direction it moves out of the path of the letter so that the feeling lever can move backwards under the action of spring 45. The nose is then in contact with the lower surface of the letter until this letter has moved off the feeding rollers 38, whereupon the feeling lever 40 returns to its initial position. The guiding rollers 62 serve for continuing the feeding of the letter or for assisting the feeding thereof.

By the above described movement of the feeding lever the lever 42 is oscillated in clockwise direction so that, by means of its stud 48 acting upon the inclined surface 49 it makes the lever 50 oscillate in anti-clockwise direction, the pawl 33 hingedly connected with said lever 50 by the link 52 being thus oscillated in clockwise direction. This pawl 33 goes consequently out of the indentation of cylinder 28 which can now revolve under the action of spring 63 in clockwise direction around its axle, whereby projection 29 will be brought into the path of boss 32 to couple the printing device to its driving means as above described.

Pawl 54 is provided with a projection 54ª which cooperates with inclined surface 54ᵇ to raise pawl 54 out of the indentation in disk 24 in which it rests, when disk 24 is rotated, moving pawl 54 to the right against the action of spring 55. The right end of pawl 33 having been pulled down, as above described, pin 59 does not interfere with the movement of pawl 54 to the right. When pawl 54 is forced out of the indentation in disk 24 it springs back to the left under the action of spring 55, until arm 57 strikes pin 58.

Before disk 24 has completed one revolution the feeling lever 40 has been released, as mentioned above, by the front edge of the letter and swung to the left. Pawl 33 is thereby returned to normal position ready to engage the guiding face 66 of clutch member 28, whereby it is guided into the indentation in said clutch member and turns the same, as disk 24 continues to rotate, until projection 29 clears boss 32, whereupon the driving connection is broken. At the same time pawls 54 and 60 drop into their respective indentations to lock disk 24 in position.

Figure 4:
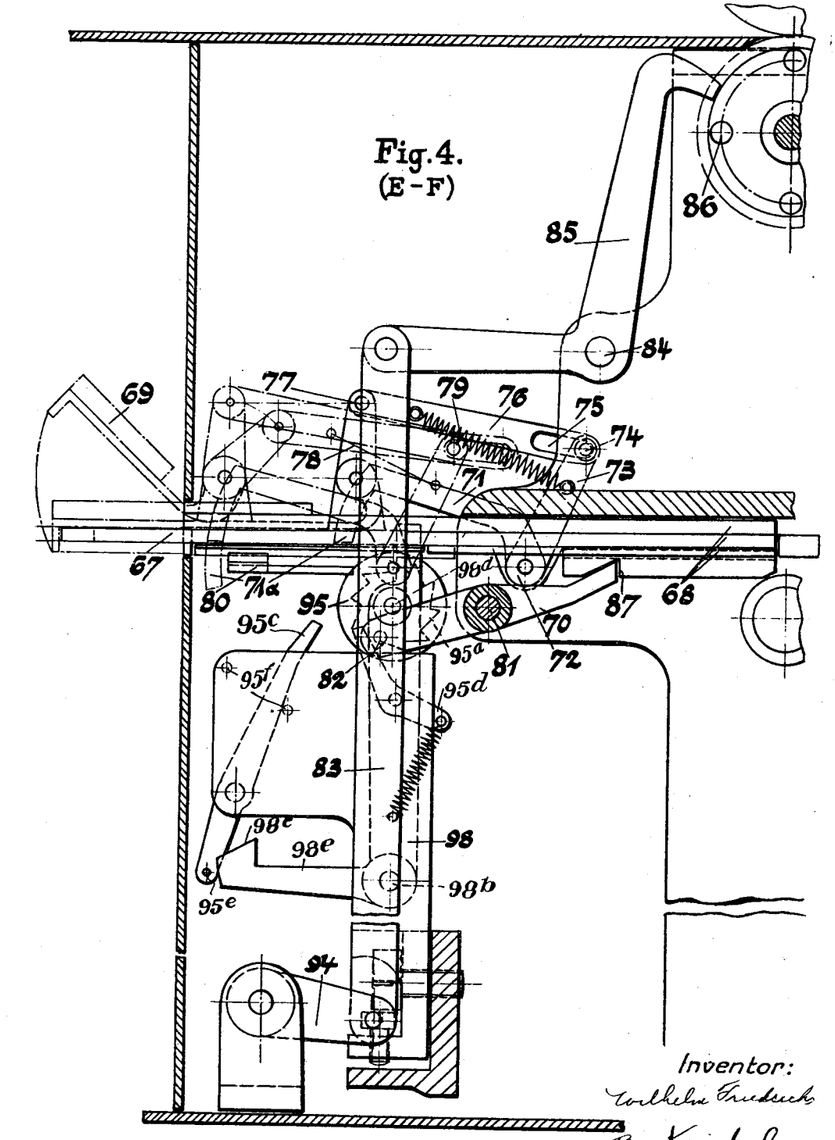
Figure 5:
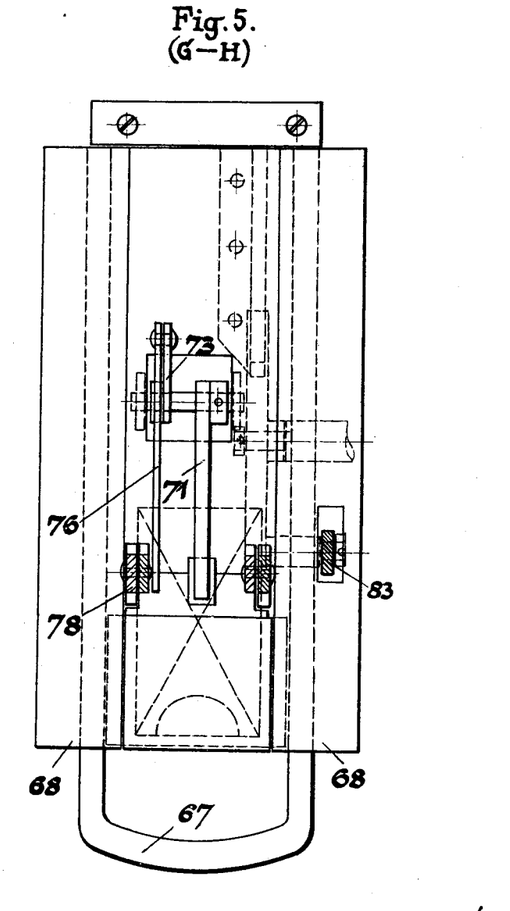
Figure 6:
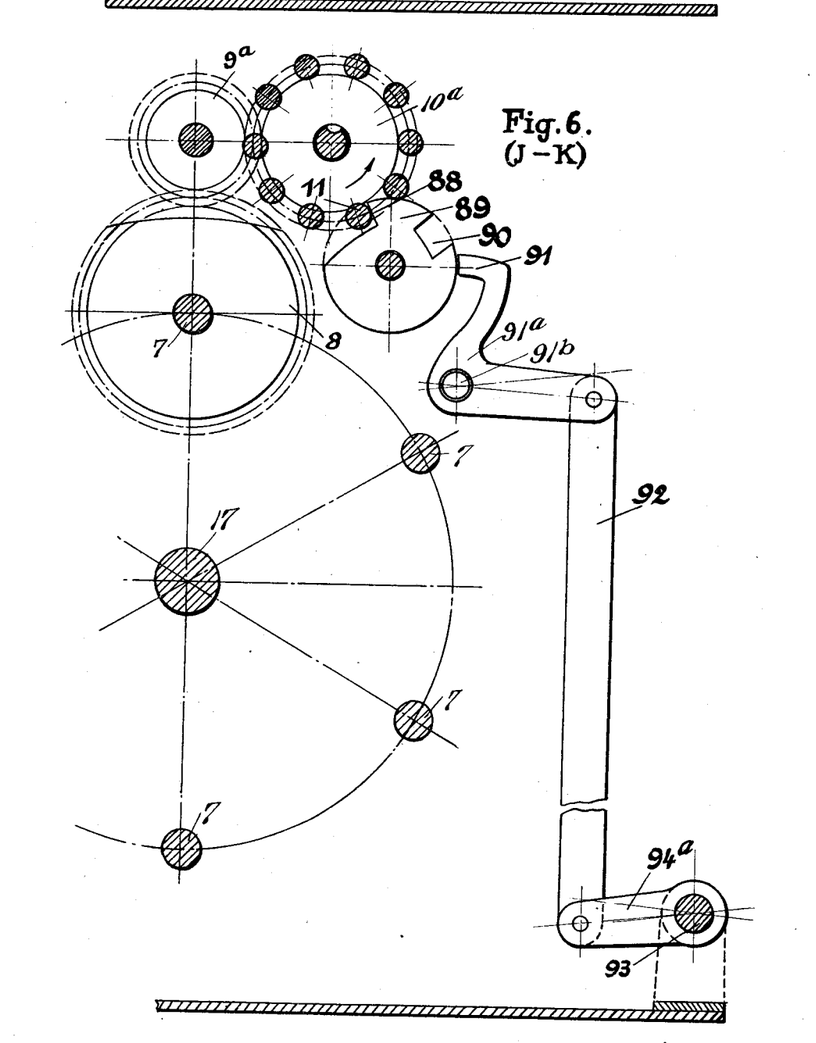
Fig. 6 is a section on line J—K of Fig. 1.
Figures 7, 8:
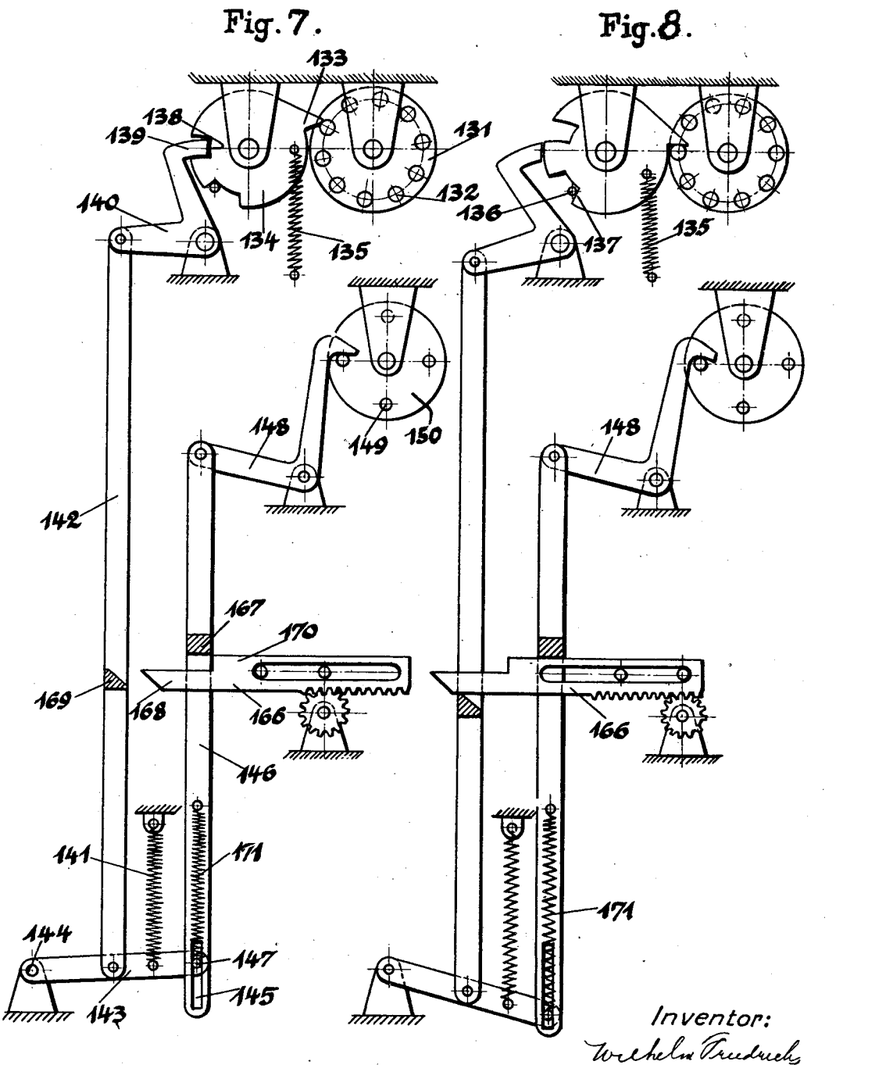
Fig. 7 shows in side elevation the locking element and the control disk of the coupling with the intermediary lever mechanism in the locking position.
Fig. 8 is a similar view as Fig. 7 showing the parts in the unlocking position. The parts of the machine which are not indispensable for the comprehension of this mechanism have not been shown on the drawing to make the same more simple.
Figures 9, 11:
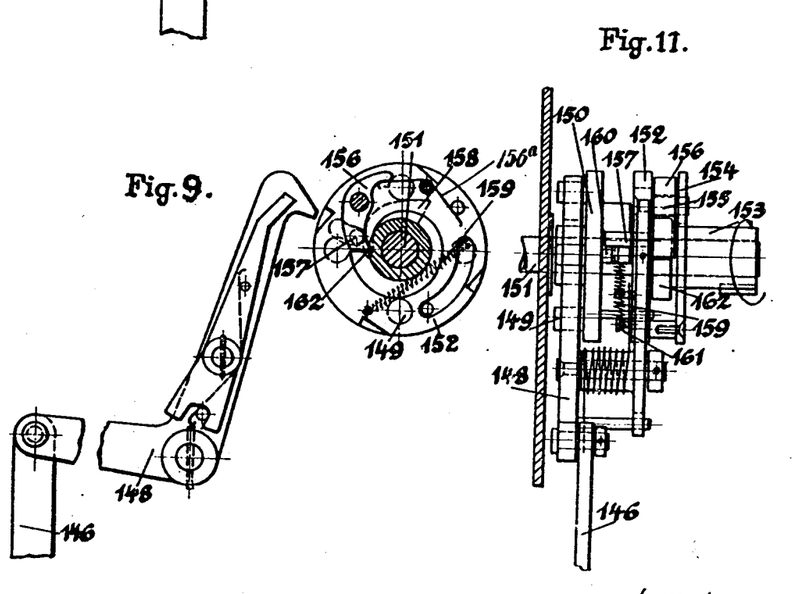
Fig. 9 shows in side elevation the motor coupling in coupling position.
Fig. 11 is a front elevation showing the coupling in the position Fig. 9.

The individual printing devices are inked in the well known manner by an inking roller and inking ribbon or the like. Each individual printing device carries a die with the value, the designation of the country and other inscriptions. The inking device has not been shown on the drawings in order to avoid unnecessary complication. In the frame of the machine a drawer 67 is arranged in guides 68 (Figs. 1ª, 4 and 5). This drawer has a lid 69 adapted to be lifted and it serves for the reception of a ticket designed to control the operation of the machine, said ticket filling the free inner space of the drawer completely. After the insertion of the ticket the lid is closed and the drawer is pushed in. At the extreme inner position of the drawer a pawl 70 comes in engagement with a notch 87 in the lower surface of the drawer so that this drawer is locked and cannot be pulled out again until pawl 70 has been moved out of notch 87 upon locking of the machine by the totalizer.

Upon the drawer a device is further arranged which prevents the insertion of the drawer as long as the same has not taken up the ticket of the prescribed conformation. This device consists essentially of a feeler 71 whose nose 71ª can pass through openings in the lid and in the bottom of the drawer. The feeler 71 is pivoted at 72 upon the drawer; it has an arm 73 with stud 74 which engages with a slot 75 of the link 76. This link 76 is pivoted at 77 to a lever 78 rigidly connected with the lid 69 of the drawer. A spring 79 attached at one end to the link 76 and at its other end to the arm 73 of the feeler 71 tends to oscillate arm 73 in anti-clockwise direction so that its stud 74 is always in contact with the left hand end of slot 75.

If lid 69 is in the open position the link 76 pushes the stud 74 towards the right so that the feeler is brought into the position indicated in dash and dot lines and held in this position, in which the nose 71ª of the feeler 71 stands over the openings of the drawer and does not engage with the same. If the lid is closed without a ticket having been previously inserted into the drawer the link 76 at the spring 79 attached to the same draws along arm 73 of the feeler so that this feeler is oscillated in anti-clockwise direction so that its nose 71ª engages with the openings of the drawer. The nose projects from the lower surface of the drawer and strikes against an abutment 80 if an attempt is made to push the empty drawer into the machine.

If, before the lid 69 is closed, a ticket has been placed into the drawer the feeler comes in contact with the upper surface of this ticket when the lid is being closed. The lid can nevertheless be completely closed as slot 75 and spring 79 permit the link 76 to move further to the left without the feeler 71 being drawn along. The drawer can now be pushed into the machine without any impediment.

As stated above the pawl 70 engages with an indentation in the bottom of the drawer 67 when this drawer is at the inner extreme position. This pawl 70 is fulcrumed at 81 to the frame of the device and its other end is articulated at 82 to a rod 83. As long as the drawer has not reached its inner extreme position pawl 70 will be pushed back by the bottom of the drawer so that rod 83 is in the raised position. In this position of rod 83 the nose of an angle lever 85 pivotally connected with rod 83 and fulcrumed at 84 is in engagement with one of a number of pins 86 a ratchet 86ª coupled with the driving mechanism. As soon as pawl 70 engages with the catch 87 of the bottom of the drawer, rod 83 is lowered and the nose of the angle lever 85 releases the ratchet so that the driving mechanism which has been locked can now freely operate. Rod 83 is further exposed to the action of a device which is controlled from the totalizer and which has the purpose to lock the drive as soon as the franking prints have reached a determined total value.

As mentioned above, the last disk 10ª of the totalizer has a series of ten pins 11 arranged on its outer face at equal intervals along its circumference. A disk 89 having an abutment 88 is revolubly mounted on the frame of the machine in such a position that the abutment 88 engages the pins 11 consecutively as the disk 10ª rotates. Consequently each time disk 10ª makes a tenth revolution one of the pins 11 will strike the abutment 88 and rotate disk 89. This part rotation of the disk 89 is sufficient to move an indentation 90 of the same in front of nose 91 of an angle lever 91ª, pivoted at 91ᵇ to the frame of the machine, so that this nose engages with the indentation under the action of a spring not shown on the drawing. The angle lever swings in anti-clockwise direction and moves the rod 92 which is hingedly connected with the same upwardly. This rod 92 is pivoted at its lower end to arm 94ª rigidly mounted on shaft 93. On the other end of shaft 93 a second arm 94 is rigidly mounted, the free end of which is pivoted to the lower end of rod 83. By the oscillation of the shaft 93 rod 83 is raised and the nose of the angle lever 85 is brought in engagement with the ratchet 86ª so that the driving device is locked. At the same time pawl 70 is lifted out of the notch 87 of the drawer by the rod 83 being raised so that the drawer can be pulled out and a fresh ticket inserted.

Upon a shaft 98ᵇ pivotally mounted in the frame of the machine are mounted arms 98 and 98ª. In the upper ends of these arms a shaft 98ᵈ is journalled upon which type wheels 95 and 95ᵇ, and ratchet 95ª are fixed. The upper ends of arms 98 and 98ª are connected to the drawer so that as the drawer is pulled out the arms are rocked forward on their pivot 98ᵇ. This brings the ratchet 95ª into engagement with a pawl 95ᶜ which rotates the ratchet, and consequently the type wheels one tenth of a revolution. Pawl 95ᵈ has advanced a tooth during this partial rotation and prevents retrograde movement of the ratchet and type wheels upon the return or closing movement of the drawer.

During the outward movement of the drawer pawl 95ᶜ is moved outwardly until it is stopped by outer stop 95ᶠ. When the drawer is pushed in the inclined surface 98ᶜ of arm 98ᵉ acts on pin 95ᵉ to move pawl 95ᶜ back against inner stop 95ᶠ.

The type wheel 95 carries ten types each denoting the number of the machine, while the wheel 95ᵇ carries ten consecutive numbers. As the drawer containing a fresh ticket is pushed in the type wheels are pressed against the ticket as the arms 98 and 98ª rock about their pivot 98ᵇ, and print the number of the machine and one of the consecutive numbers on the card. When the drawer is moved out the type wheels are rotated a tenth of a revolution so that the next consecutive number is brought into position to stamp the card next inserted in the drawer. The cards will thus be stamped with the number of the machine and a series of consecutive numbers so that when they are returned to the post office it can be determined whether they have all been returned or not.

A corresponding control impression upon the newly issued tickets comprises also a consecutive figure so that the comparison of the figures stamped by the machine and those previously printed on the tickets permits at once the discovery of any fraudulently inserted tickets. The pulling out of the drawer can be facilitated by a crank or lever transmission.

Instead of the stamping device described any other stamping device could be used of course, for instance a stamping cylinder with mechanically advanced consecutive number and with a stationary machine number.

According to the invention a determined series of tickets must be held in store for each machine, said tickets being consecutively numbered. Instead of the tickets previously printed, paper strips could be used from which the tickets are separated according to requirement, or unprinted paper strips. In the latter case the paper strip would have to be printed before the ticket is cut off. In accordance with the consecutive number these tickets are issued against payment of, for instance 1000 marks, for each ticket. The used tickets upon which a consecutive number has again been marked by the apparatus together with the machine number have to be returned to the office. In the office all the tickets in store and all the used tickets must be present, with the exception of perhaps two tickets, of which one is in the machine and the second held in store by the client.

With the aid of signs, for instance control lines extending obliquely over the edges of the tickets, the official can ascertain at once, without examining the tickets, whether the tickets have been returned in proper succession and whether the tickets returned are original tickets or false tickets.

A paper strip printed to represent a series of tickets and wound up in a roll could be inserted in the apparatus and the tickets could be successively cut off this paper strip for insertion into the locking device. The payment would in this case have to take place in exchange for the roll of tickets.

If the machine is driven by a motor the automatic coupling and uncoupling device shown in Figs. 7 to 11 will be preferably used.

The extreme disk 131 of the totalizing mechanism corresponding to disk 10$^a$ of Fig. 1 has pins 132 corresponding to pins 11 designed to act upon the nose 133 of a disk 134. This disk 134 is normally held by the action of a spring 135 in the position shown in Fig. 8; said position being limited by an abutment 136 with which a surface 137 of disk 134 comes in contact. If the extreme disk 131 of the counting mechanism is revolved for part of its revolution in clockwise direction by the transfer of tens, one of the pins 132 will act upon nose 133 so that disk 134 is revolved against the action of spring 135 in anti-clockwise direction. Owing to this rotation the indentation 138 of disk 134 is brought before the nose 139 of locking lever 140. The locking lever which is controlled by spring 141 engages by its nose 139 with the indentation 138.

This movement of lever 140 is transmitted by rod 142 and the transmission lever 143 to a locking member designed to lock the driving mechanism for the machine.

In the mechanism shown on the drawing the connecting rod 142 transmits its movement to the lever 143 which is pivotally mounted at 144 upon the machine frame. This movement is further transmitted by the pin 147 guided in a slot 145 of rod 146 to this rod the upper end of which is hingedly connected with an angle lever 148 the nose of which is thus brought into the path of pins 149 of the control disk 150 for the motor coupling and locks this control disk. Means are provided, which will now be described, for immediately uncoupling the motor from the driving shaft of the machine upon the locking of the control disk 150.

The control disk 150 is revolubly mounted upon the driving shaft 151 of the machine which corresponds to shaft 35 of Fig. 1. At the side of disk 150 a second disk 152 is arranged which is rigidly connected with shaft 151. Upon this shaft a bush 153 is loosely mounted. Bush 153 is held against axial displacement by a disk 154, which is loosely mounted on the bush and is rigidly connected with disk 152.

Upon a stud 155 of disk 152 pawl 156 is loosely mounted. This pawl 156 has a pin 157 which extends through a slot 157$^a$ in disk 152 and reaches to the proximity of the end face of disk 150. Pin 157 is controlled by a cam 158 of disk 150 so that, if disk 150 revolves with regard to disk 152, said pin 157 is acted upon.

Bush 153 is rigidly connected with the engine shaft so that it participates continuously in the rotation of this shaft.

Disk 150 is connected with disk 152 by a spiral spring 159 one end of which is attached to stud 160 of disk 150, its other end being attached to pin 161 of disk 152. The bush 153 carries a spiral-shaped projection 162 which is situated in the same plane as the pawl 156 of disk 152.

Upon locking pawl 148 a second pawl 163 is hingedly mounted which is acted upon by a spring 164.

If the locking pawl engages with the pins 149 of the control disk 150 the free end of pawl 163 comes in contact with the rim of disk 152 and engages finally with one of the indentations 165 of this disk.

The operation is as follows:—

Figure 10:
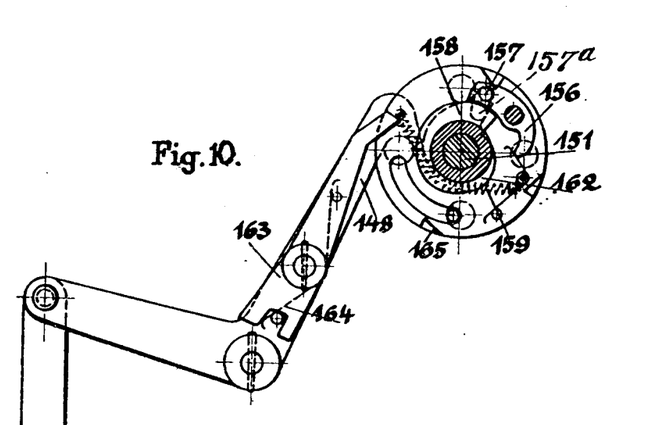
Fig. 10 is a similar view showing the coupling in uncoupled position.

In the coupled position (Figs. 9 and 10) pawl 156 grips behind the cam 162 of bush 153. The bush 153 driven directly from the motor and rotating in clockwise direction draws along by means of cam 162 the pawl 156 of disk 152 and consequently the driving shaft 151 upon which disk 152 is keyed. As disk 152 is connected with the control disk 150 by the spring 154 this disk 150 participates also in this movement. If now pawl 148 is brought into the path of the pins 149 of the control disk it stops the control disk as shown in Fig. 10. The disk 152 with pawl 156 continues at first its movement in opposition to the action of spring 159.

Pin 157 of pawl 156 slides upon the cam 158 of disk 150 and this cam lifts a pawl 156 so that it gets out of engagement with projection 162 of bush 153. Spring 156$^a$ holds pin 157 in engagement with cam 158. The coupling between disk 152 and bush 153 is thus uncoupled and consequently also the coupling between the motor shaft and the drive shaft 151.

This uncoupling takes place when the disk 152 has rotated 90 degrees after lever 148 has engaged one of the pins 149. At this instant pawl 163 engages in one of the notches 165 of disk 152, whereby disks 150 and 152 are held in their relative positions so that pawl 156 is held out of engagement with cam 162. When lever 148 is withdrawn from contact with pin 149 spring 159 returns disks 150 and 152 to their normal relative positions with pin 157 at the low end of cam 158. Pawl 156 then engages projection 162 and couples the motor to the driving shaft 151 again.

The uncoupling of the motor is effected, as mentioned above, simultaneously with the locking of the totalizing mechanism. The coupling of the motor is however effected preferably only after all the adjusting and controlling measures which are necessary for the re-starting of the machine have been terminated and only at the last moment, possibly only after the unlocking of the totalizing mechanism. With this object in view the coupling is effected with the aid of an accumulated power.

The rod 146 for the locking pawl 148 has a slot 145 in which the pin 147 of lever 143 engages. The displacement of rod 146 in an upward direction, viz in the sense of the locking movement, is effected positively by the action of pin 147 upon the end of slot 145.

In order to prevent unlocking of the disk 150 by locking pawl too soon with consequent premature coupling of the motor, lever 146 is locked by means of an operating element 166, which operates the adjusting and controlling members of the machine, as this operating member or an extension of the same grips under an abutment 167 of rod 146.

In the machine described a drawer has to be pulled out in which the control ticket is enclosed and this drawer must be pushed in completely after a fresh ticket has been inserted before the machine can be used again. The drawer forms the operating member 166. At its front end it has an inclined face 168 which, if the drawer 166 is pulled to the left, acts upon an inclined abutment 169 of rod 142. Upon movement of the drawer 166 to the left this abutment 169 and rod 142 are forced downward so that the locking lever 139 is pulled out of the indentation 138 of the locking disk 134 of the totalizing mechanism which locking disk can now return to its unlocking position under the action of spring 135.

By the movement of the connecting rod 142 lever 143 has descended against the action of spring 141. Rod 146 has not participated in this movement as its abutment 167 is still in contact with the upper surface 170 of the operating member 166 and consequently lock 147 has descended in slot 145 of rod 146, spring 171 being thus put under tension. This spring 171 is fixed at one end to the lever 143 and at the other end to rod 146. The locking pawl 148 is therefore still in engagement with the pins 149 of disk 150. If, after the controlling and adjusting measures have been completed, in the present case after a new control ticket has been placed into the drawer 166, this drawer has been pushed back to its inner extreme position, surface 170, the length of which is selected correspondingly, releases the abutment 167 and rod 146 is now lowered by the action of spring 171 so that pawl 148 comes out of engagement with the pin 149 of disk 150.

Disk 150 moves now in the above described manner to its coupling position, whereby the throwing in gear of the motor is effected.

If upon the control ticket not only the consecutive number has to be printed, as was supposed in the form of construction shown in Figs. 1 to 6 but simultaneously the final number of the totalizing mechanism, the ticket must be moved perpendicularly against the die as evidently the result of the counting mechanism cannot be expressed by type wheels which roll upon the ticket as is the case in the above described form of construction.

Figure 12:
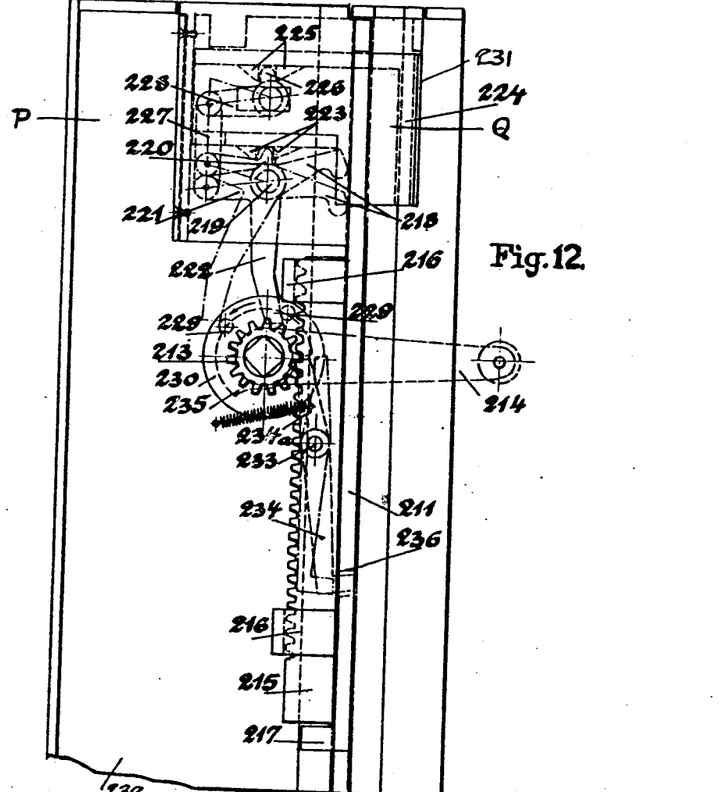
Fig. 12 is a longitudinal section through another form of construction of the slide which holds the ticket or through its adjusting mechanism.
Figure 13:
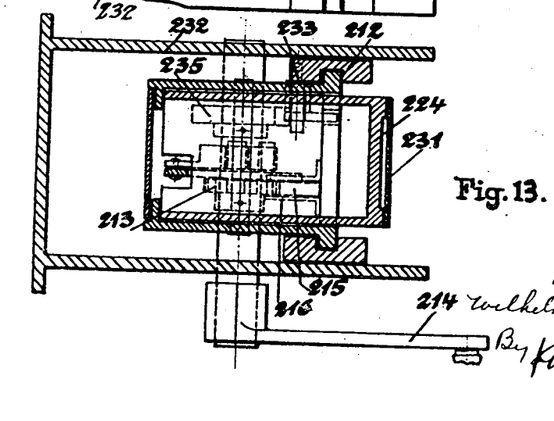
Fig. 13 is a cross-section on the line P—Q of Fig. 12.

In this case the driving mechanism for the drawer is constructed as shown in Figs. 12 and 13.

The drawer 211 is guided in lateral grooves 212 and operated with the aid of a toothed wheel 213 which is alternately but uniformly revolved to the right or to the left by means of a crank handle 214 or from a motor. Toothed wheel 213 acts upon the rack 215 which is movably guided in guides 216. Upon the displacement of the rack the right end of the same acts upon a projection 217 of the drawer 211 and its left end acts upon a lever 218. This lever 218 is fulcrumed at 219 and rigidly connected with the three levers 220, 221, 222.

Lever 220 penetrates between cams 223 of a box 224 which is adapted to be displaced vertically in the drawer, said cams being arranged on the right end wall of this box. At the left end wall of the box similar cams 225 are provided between which an arm 226 of an angle lever engages, the other arm 228 of which is hingedly connected by a connecting member 227 with lever 221. The elements 220, 221, 227, 228 and 226 form an articulated parallelogram so that the levers 220 and 226 move in the same direction and ensure a parallel displacement of box 224.

Lever 222 engages between cams 229 of a cam disk 230 rigidly connected with toothed wheel 213 and serving for a purpose which will be explained hereafter.

The box 224, adapted to be displaced vertically, carries upon its top surface the ticket 231 which has to be printed with the controlling signs.

Upon the machine frame 232 pawl 234 is pivotally mounted by means of a bolt 233. This pawl is constructed like a two-armed lever. Upon the end 234$^a$ of this pawl acts a cam disk 235 which is rigidly connected with toothed wheel 213 and communicates to pawl 234, against the action of a spring, a downward movement at determined times or at determined positions of the toothed wheel. In its upper position the pawl engages with an indentation 236 of the drawer 211 and locks the forward movement of this drawer.

The operation of the device is as follows:—

If the crank handle 214 is turned and the toothed wheel 213 is rotated, the rack 215 is moved towards the left from the position shown in Fig. 12. The pawl 234 is at this movement in engagement with the indentation 236 of the drawer 211 so that this drawer does not participate in the movement of rack 215. At the beginning of this movement cam 229 of cam disk 230 presses upon lever 222 so that the cams 220 and 226 rigidly connected with lever 222 move the box 224 upward and press the ticket 231 against the die arranged above the box 224. The ticket 231 is thus printed or stamped. When the box 224 has reached its extreme upper position and when consequently lever 222 has arrived at its lowest end position cam 229 slides off this lever, provided the length of the same has been properly selected. This position is indicated by dash and dot lines. At this moment the left end of rack 215 has reached lever 218 which stands at the position indicated in dash and dot lines.

At the further movement of rack 215 to the left lever 218 is brought into the position shown in dash lines, the box 224 being pushed downward by the cams 220 and 226. As soon as the box has reached its lowest end position, that is to say moves in contact with the bottom surface of the drawer 211, a further movement of lever 218 is no longer possible so that now drawer 211 must move towards the left under the pressure exerted by the rack 215 upon the lever 218. The pawl 234 has at this moment come out of engagement with the indentation 236 so that it no longer prevents the drawer from moving.

After the drawer 211 has arrived at its extreme left position and the ticket 231 has been replaced by a fresh ticket the crank handle is turned in clockwise direction so that at first rack 215 moves to the right until it comes in contact with the projection 217 of the drawer 211, whereupon it draws along said drawer 211 to bring it back into the inner end position shown in Fig. 12. In this position pawl 234 engages again with the indentation 236.

I claim:—

1. In a cash franking machine of the type described, means for applying franks, means actuated upon completion of a predetermined amount of use for locking the machine against further use, an actuator operable upon insertion therein of a token for releasing said locking means, means for preventing said token from being removed until the machine is next locked, and means actuated when the machine is next locked for permitting the token to be removed from the machine.

2. The device of claim 1 in combination with means for marking the token to facilitate detection of fraud.

3. In a cash franking machine of the type described, means for applying franks, means actuated upon completion of a predetermined amount of use for locking the machine against further use, means operable upon insertion therein of a token for unlocking the machine, means actuated when the machine is next locked for permitting the token to be removed from the machine, and means actuated by the machine unlocking means for marking the token to facilitate detection of fraud.

4. In a cash franking machine of the type described, means for applying franks, means actuated upon completion of predetermined amount of use for locking the machine against further use, means for releasing said lock comprising a drawer, a pocket in said drawer for receiving a token, and an opening in the bottom of said pocket, a detent positioned over said opening when said drawer is pulled out, and means actuated by the pushing in of the drawer for resiliently urging said detent into said opening, whereby said drawer will be prevented from closing unless a token is placed in said pocket.

5. In a franking machine, a revoluble drum, a series of printing devices rotatably mounted around the periphery of said drum, a guide block having a concave edge rigidly mounted on each printing device, and a stationary annular guiding disk for cooperating with said concave edges to prevent the rotation of the printing devices, said disk being cut away at the point where the operative printing device is positioned to permit rotation thereof.

6. In a franking machine, means for printing franks, means for driving said printing means, means for locking said driving means, a spring connected to said locking means, cam means for tensioning said spring, said spring when under tension tending to release said locking means, a reciprocating member actuating said tensioning means upon movement of said member in one direction, said locking means having a lug engaging said reciprocating member during the tensioning movement of said member to prevent the release of said locking means, said lug disengaging from said reciprocating member on the reverse movement of the latter, and means locking said tensioning means in tensioning position during said reverse movement of the reciprocating member.

7. A franking machine as set forth in claim 6 in combination with counting means, the means for locking the tensioning means in tensioning position being controlled by the counting means.

8. In a franking machine, a revoluble drum, a series of printing devices mounted around the periphery of said drum, a guide block having a concave edge rigidly mounted on each printing device, a stationary annular guiding disk for cooperating with said concave edges to prevent the rotation of said printing devices, said disk being cut away at the point where the operative printing device is positioned to permit rotation thereof, a drive shaft for rotating said printing devices, a coupling member on said shaft positioned opposite the cut away portion of said disk, an engaging portion on said coupling member in the form of an arc having a center on the axis of said drum, and complementary engaging portions on said guide blocks adapted to cooperate with the engaging portion of said coupling member.

In testimony whereof I affix my signature.

WILHELM FRIEDRICHS.

CERTIFICATE OF CORRECTION.

Patent No. 1,741,927.  Granted December 31, 1929, to

WILHELM FRIEDRICHS.

Figure 14:
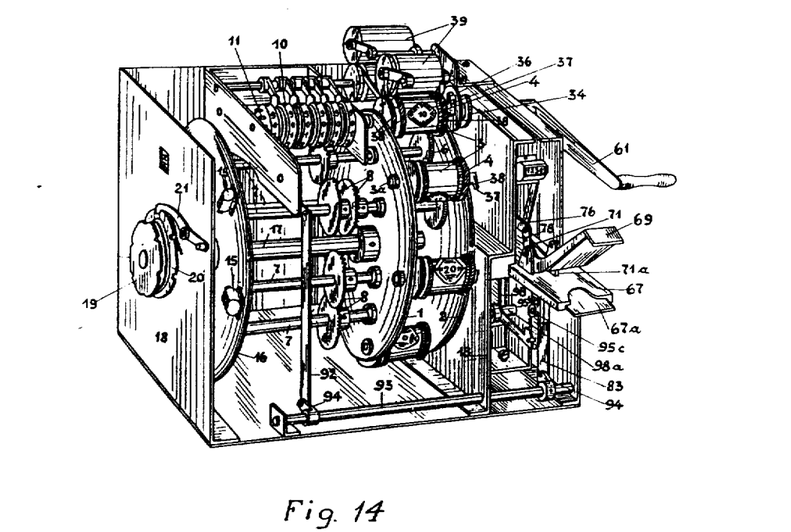
Fig. 14 is a perspective view of the machine.

It is hereby certified that error appears in the above numbered patent requiring correction as follows:
In the drawings, Sheet 11, Figure 14, as shown below should appear as part of the patent;

Dec. 31, 1929.  W. FRIEDRICHS  1,741,927

CASH FRANKING MACHINE

Filed Aug. 8, 1922   11 Sheets-Sheet 11

Fig. 14

Inventor
Wilhelm Friedrichs
By Knight Bros
attys.

and that the said Letters Patent should be read with this correction therein that the same may conform to the record of the case in the Patent Office.

Signed and sealed this 15th day of July, A. D. 1930.

(Seal)

Wm. A. Kinnan,
Acting Commissioner of Patents.